United States Patent [19]
Kitaori et al.

[11] Patent Number: 5,796,533
[45] Date of Patent: Aug. 18, 1998

[54] SYSTEM FOR MAGNETIC CONTACT DUPLICATION

[75] Inventors: Noriyuki Kitaori; Osamu Yoshida; Hirohide Mizunoya; Shigemi Wakabayashi; Akira Shiga, all of Tochigi, Japan

[73] Assignee: Kao Corporation, Tokyo, Japan

[21] Appl. No.: 404,444

[22] Filed: Mar. 15, 1995

[30] Foreign Application Priority Data

Mar. 15, 1994 [JP] Japan .................. 6-044376
Mar. 15, 1994 [JP] Japan .................. 6-044378

[51] Int. Cl.$^6$ .................................. G11B 5/86
[52] U.S. Cl. ......................... 360/17; 428/694 T
[58] Field of Search ...................... 360/17, 16, 15, 360/134; 428/216, 694 T, 694 TM, 900

[56] References Cited

U.S. PATENT DOCUMENTS

| | | | |
|---|---|---|---|
| 4,091,158 | 5/1978 | Kasuga | 360/134 |
| 4,387,136 | 6/1983 | Saito | 360/134 |
| 4,410,603 | 10/1983 | Yamamori | 428/694 T |
| 4,819,102 | 4/1989 | Shirai | 360/17 |
| 5,164,243 | 11/1992 | Kanazawa | 360/134 |
| 5,247,397 | 9/1993 | Sato | 360/17 |
| 5,418,059 | 5/1995 | Sugita | 428/694 T |

FOREIGN PATENT DOCUMENTS

163722   6/1992   Japan .................. 360/16

*Primary Examiner*—Aristotelis M. Psitos
*Assistant Examiner*—Alan Faber
*Attorney, Agent, or Firm*—Oblon, Spivak, McClelland, Maier & Neustadt, P.C.

[57] ABSTRACT

A system for magnetic contact duplication by transferring an information signal recorded on a mother tape onto a blank tape, wherein the mother tape and the blank tape each includes at least one magnetic thin film having columns of magnetic grains grown obliquely, the column gradient $\theta_{B1}$ of the magnetic grains in an uppermost magnetic thin film of the blank tape being smaller than the column gradient $\theta_{M1}$ of the magnetic grains in an uppermost magnetic thin film of the mother tape, the mother tape and blank tape are superposed such that the column growth direction of the magnetic grains in the uppermost magnetic thin film of the mother tape and the column growth direction of the magnetic grains in the uppermost magnetic thin film of the blank tape intersect and such that these uppermost magnetic films face each other, and a bias magnetic field is applied from the substrate side of the blank tape.

20 Claims, 5 Drawing Sheets

SYSTEM FOR MAGNETIC CONTACT DUPLICATION

FIELD OF THE INVENTION

The present invention relates to a magnetic contact duplication technique for use, for example, in transfer recording of an information signal of a mother tape onto a blank tape.

BACKGROUND OF THE INVENTION

Magnetic contact duplication techniques have hitherto been proposed as a means for fast recording an information signal of a first magnetic recording medium (called a mother tape, a mirror mother tape or a master tape) on a second magnetic recording medium (called a blank tape or a slave tape).

For example, JP-A-4-163722 (the term "JP-A" as used herein means an "unexamined published Japanese patent application") proposes a magnetic contact duplication technique including contact transferring recorded magnetization of a magnetic thin film-type mother tape to a magnetic thin film-type blank tape by applying an external bias magnetic field while keeping the mother tape and the blank tape in the state where their magnetic thin films are superposed as that the column gradients (tilt angles) of magnetic grains of these magnetic thin films are in the reverse direction with respect to each other, wherein the external bias magnetic field is applied at an angle of 110°±15° from the in-plane direction of the mother tape which has an axis of easy magnetization set at 20°±15° from the in-plane direction.

SUMMARY OF THE INVENTION

As a result of intensive investigations on a magnetic contact duplication capable of providing further improvement in the magnetic transfer efficiency, reduced demagnetization and high transfer output, the present inventors have found that the magnetic transfer efficiency is greatly affected by the relation in the column gradient (tilt angle) of magnetic grains of the magnetic thin film-type mother tape and of the magnetic thin film-type blank tape, i.e., the relation between the column gradient of the magnetic grains in the uppermost magnetic thin film of the magnetic thin film-type mother tape ($\theta_{M1}$) and the column gradient of the magnetic grains in the uppermost magnetic thin film of the magnetic thin film-type blank tape ($\theta_{B1}$) has a great effect on the magnetic transfer efficiency, and that by using a combination of a mother tape and a blank tape satisfying the condition of $\theta_{M1} > \theta_{B1}$, demagnetization of the mother tape can be diminished and high transfer output can be provided. The present invention has been accomplished based on this finding.

Accordingly, an object of the present invention is to provide a technique for transferring an information signal with a diminished demagnetization of the mother tape and a high transfer output.

Namely, the present invention provides a method for magnetic contact duplication an information signal recorded on a mother tape onto a blank tape, wherein the mother tape and the blank tape each comprise at least one magnetic thin film comprising columns of magnetic grains grown obliquely, the column gradient $\theta_{B1}$ of the magnetic grains in an uppermost magnetic thin film of the blank tape being smaller than the column gradient $\theta_{M1}$ of the magnetic grains in an uppermost magnetic thin film of the mother tape, the mother tape and the blank tape are superposed such that the column growth direction of the magnetic grains in the uppermost magnetic thin film of the mother tape and the column growth direction of the magnetic grains in the uppermost magnetic thin film of the blank tape intersect and that these uppermost magnetic thin films face each other, and a bias magnetic field is applied from a substrate side of the blank tape.

DETAILED DESCRIPTION OF THE INVENTION

In the practice of the present invention, the bias magnetic field to be applied on the transfer may be generated and applied to the tapes in a conventional manner at any angle, though a bias magnetic field generated by a ring-type magnetic head is preferred.

In the present invention, $\theta_{M1}$ is preferably from 20° to 90° and $\theta_{B1}$ is preferably from 5° to 60°. In other words, by satisfying not only the condition of $\theta_{M1} > \theta_{B1}$ but also that $\theta_{M1}$ is from 20° to 90° and $\theta_{B1}$ is from 5° to 60°, the degree of demagnetization is further reduced and at the same time high output can be achieved. Also, by satisfying the condition that the difference between $\theta_{M1}$ and $\theta_{B1}$ ($\theta_{M1} - \theta_{B1}$) is from 15° to 75°, the demagnetization is further reduced and at the same time good transfer output can be achieved.

The magnetic recording medium (a mother tape and/or a blank tape) to be used in the present invention may comprise two or more magnetic thin film comprising columns of magnetic grains grown obliquely. In this case, the magnetic recording medium is preferably constructed such that the gradients of the columns of the magnetic thin films increase from the lower film close to the substrate toward the upper film. In particular, it is more preferred that the lowermost magnetic thin film (the n'th-film) closest to the substrate of the blank tape has a column gradient $\theta_{Bn}$ of from 5° to 45° and the uppermost magnetic thin film farthest from the substrate of the blank tape has a column gradient $\theta_{B1}$ of from 25° to 60°. Also, it is preferred that the lowermost magnetic thin film (the n'th-film) closest to the substrate of the mother tape has a column gradient $\theta_{Mn}$ of from 20° to 45° and the uppermost magnetic thin film farthest from the substrate of the mother tape has a column gradient $\theta_{M1}$ of from 40° to 90°. By further satisfying these conditions, the demagnetization can be further reduced and at the same time high transfer output can be achieved.

Further, in the magnetic recording media used in the method of the present invention, the column size of the magnetic grains in the uppermost magnetic thin film of the blank tape is preferably a half or less of the column size of the magnetic grains in the uppermost magnetic thin film of the mother tape. The column size of the magnetic thin film as defined herein means the diameter of the column at the surface of the magnetic thin film. More specifically, the magnetic recording media used in the present invention is preferably constructed such that the column size $a_B$ of the surface of the uppermost magnetic thin film of the blank tape and the column size $a_M$ of the surface of the uppermost magnetic thin film of the mother tape satisfy the condition of $a_B \leq \frac{1}{2}a_M$, more preferably $\frac{1}{5}a_M \leq a_B \leq \frac{1}{2}a_M$.

Furthermore, it is preferred that the column size $a_M$ of the surface of the uppermost magnetic thin film of the mother tape is from 10 to 100 nm and the column size $a_B$ of the surface of the uppermost magnetic thin film of the blank tape is from 5 to 50 nm.

According to the present invention, the column gradient and the column size of the magnetic grains in the magnetic thin film may be determined in the following manner.

Figure 9:
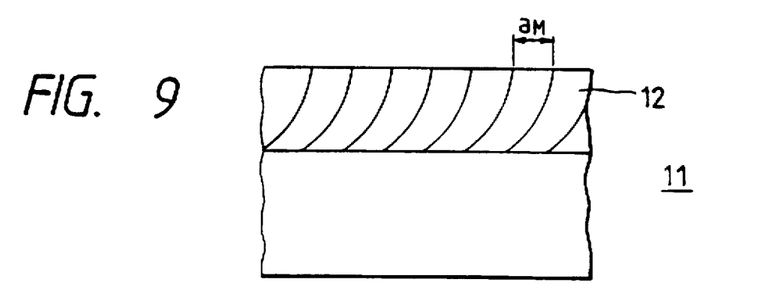
FIG. 9 is a schematic side view showing the column size $a_M$ of a mother tape comprising one magnetic thin film.
Figure 10:
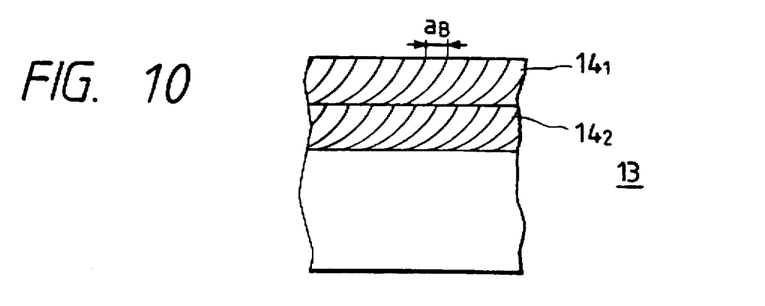
FIG. 10 is a schematic side view showing the column size $a_B$ of a blank tape comprising a plurality of magnetic thin films.

Namely, the tape is secured by a resin and cut by a microtome with two cuts running parallel with the lengthwise direction of the tape, the cuts thus forming right angles with the widthwise direction of the tape. The resulting ultrathin film strip has a thickness of 50 nm. The cut plane of the film strip of the tape is observed through a transmission-type electron microscope to take a photograph thereof. Then, the column gradient of the magnetic grains in the magnetic thin film of the tape as defined in FIG. 2, for example, and the column size of the magnetic grains in the magnetic thin film as defined in FIG. 9, for example, are determined from the photograph.

It is preferred that the magnetic thin film of the mother tape has a coercive force $Hc_M$ of from 1,300 to 2,500 Oe and a residual magnetic flux density $Br_M$ of from 5,000 to 7,000 G and the magnetic thin film of the blank tape has a coercive force $Hc_B$ of from 900 to 1,300 Oe and a residual magnetic flux density $Br_B$ of from 3,000 to 5,000 G. where $Hc_B < Hc_M$ and $Br_B < Br_M$ are more preferred.

The substrate used in the magnetic recording media for use in the present invention is not particularly restricted and in general, organic materials including olefinic resins such as a polyester (e.g., PET), a polyamide, a polyimide, a polysulfone, a polycarbonate and a polypropylene, a cellulosic resin and a vinyl chloride-based resin; ceramics such as glass; and metal materials such as aluminum alloy may be used.

On the surface of the substrate, an undercoat layer may be provided so as to improve the adhesion of magnetic layers (magnetic thin films). More specifically, by providing the undercoat layer, the surface can have an appropriate roughness and whereby, for example, the adhesion of magnetic thin films provided by oblique evaporation is improved and, furthermore, the running property can be improved due to the adequate surface roughness of the magnetic thin film surface. Such an undercoat layer can be constructed by providing a coating containing particles, for example, of $SiO_2$ and having a thickness of 0.05 to 0.5 µm.

Further, on one surface of the substrate, a soft magnetic thin film may be provided, for example, by a dry plating such as sputtering. By providing such a soft magnetic thin film, efficiency of the bias magnetic field on the magnetic contact duplication can be improved. Examples of the constituent material of the soft magnetic thin film include alloys such as Fe-Ni alloys, Fe-Si alloys, Fe-Al alloys, Ni-Bi-Fe alloys and Fe-Si-Al alloys and ceramics such as MnZn-ferrite and Co.ferrite. The soft magnetic thin film composed of such a material preferably has a thickness of approximately from 0.01 to 0.50 µm. If the thickness is less than 0.01 µm, the effect resulting from providing the soft magnetic thin film is small. On the other hand, if it exceeds 0.50 µm, the distance between the magnetic thin film and the bias magnetic head on the transfer increases and, therefore, the bias magnetic field is greatly attenuated. In addition, the improvement in the effect is not so rewarding in this case and thus it is disadvantageous in view of productivity and cost.

In the case where a soft magnetic thin film as described above is provided on one surface of the substrate, the one or more magnetic thin films are to be provided thereon, for example, by oblique evaporation. Examples of the constituent magnetic grains of the magnetic thin film include metals such as Fe, Co and Ni, Co-Ni alloys, Co-Pt alloys, Co-Ni-Pt alloys, Fe-Co alloys, Fe-Ni alloys, Fe-Co-Ni alloys, Fe-Co-B alloys, Co-Ni-Fe-B alloys, Co-Cr alloys, and those obtained by incorporating a metal such as Al into these materials. In addition, Fe-N alloys, Fe-N-O alloys, Fe-C alloys and Fe-C-O alloys may also usable. During forming of the magnetic thin film, an oxidizing gas is preferably fed to form a metal oxide film as a protective layer on the surface of the magnetic thin film. It is further preferred to provide diamond-like carbon, boron carbide or silicon nitride as a protective layer. Furthermore, a fluorine-based or carbon-based lubricant layer is preferably provided as an upper layer of the protective layer.

The magnetic recording media used in the present invention comprises at least one magnetic thin film. In the case where two or more magnetic thin films are provided, although there is no particular limitation to the number, two or three layers are normally provided. The total thickness of the magnetic thin film(s) is preferably from 0.12 to 0.50 µm, more preferably from 0.15 to 0.30 µm for the mother tape and it is preferably from 0.10 to 0.30 µm, more preferably from 0.12 to 0.25 µm for the blank tape.

Figure 1:
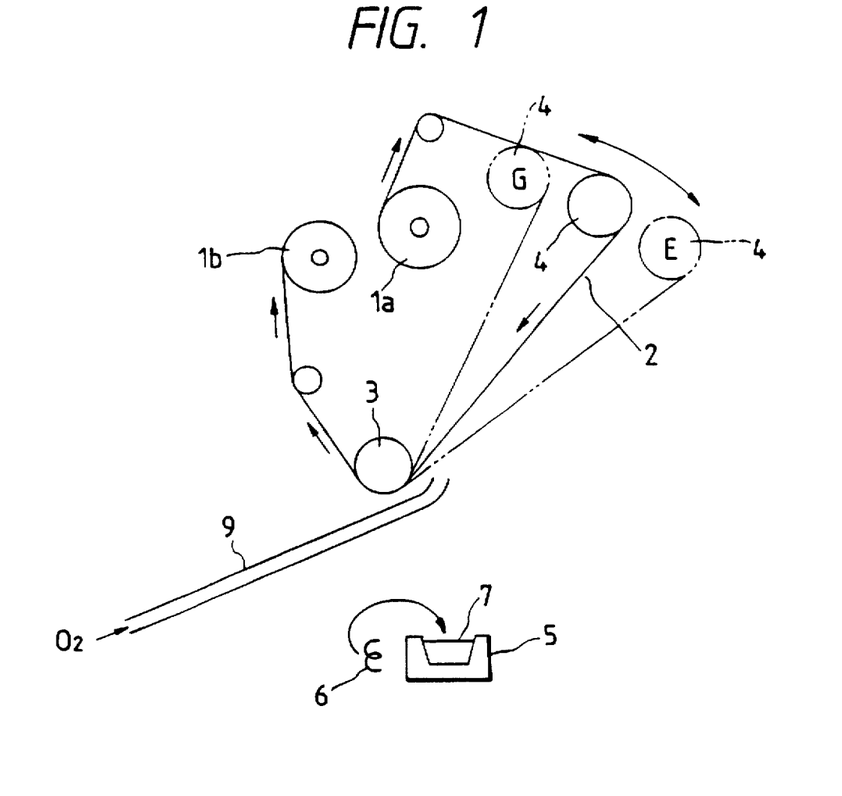
FIG. 1 is a schematic view showing an oblique evaporation apparatus for producing a mother tape and a blank tape.

Referring now to the drawings, where like reference numerals designate identical or corresponding parts throughout the several views, as an apparatus for forming the magnetic thin film by oblique evaporation, an apparatus as shown in FIG. 1 can be employed.

In FIG. 1, 1a is a feeding roller of a substrate 2, 1b is a take-up roller of the substrate 2, 3 is a cooling can roller, 4 is a guide roller provided on the running path of the substrate 2 between the feeding roller 1a and the cooling can roller 3, 5 is a crucible, 6 is an electron gun and 7 is a magnetic metal, and 9 is an oxygen gas feeding nozzle. As shown in FIG. 1, the guide roller 4 is movably provided and by variably controlling the set up position of the guide roller 4, the column gradient $\theta$ of the magnetic grains deposited by oblique evaporation can be controlled.

In FIG. 1, the column gradient $\theta_E$ of the magnetic grains deposited by oblique evaporation with the guide roller 4 set at the position E is larger than the column gradient $\theta_G$ of the magnetic grains deposited by oblique evaporation with the guide roller 4 set at the position G (the left side of the position E. i.e., the position where the standing angle of the substrate 2 from the guide roller 4 toward the cooling can roller 3 becomes large against grains flying from the crucible 5).

Figure 2:
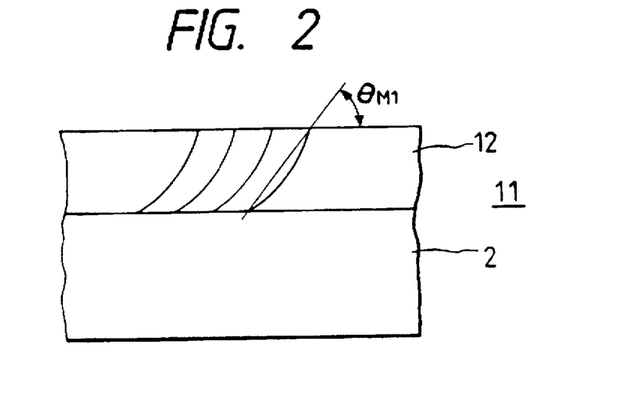
FIG. 2 is a schematic cross section of a mother tape comprising one magnetic thin film.
Figure 3:
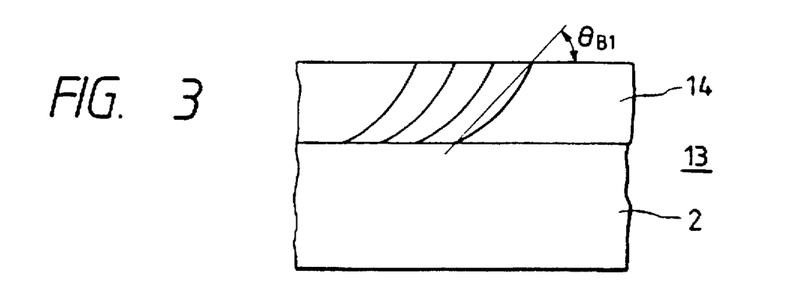
FIG. 3 is a schematic cross section of a blank tape comprising one magnetic thin film.

More specifically, in the apparatus as shown in FIG. 1, if the mother tape and the blank tape are produced by positioning them correspondingly, namely, the mother tape is produced by setting the guide roller 4 at the position E and the blank tape is produced by setting the guide roller 4 at the position G, each tape can be of a magnetic thin film-type where the column of the magnetic thin film is grown obliquely and the resulting magnetic recording media can satisfy the condition that the column gradient $\theta_{B1}$ of the magnetic thin film of the blank tape is smaller than the column gradient $\theta_{M1}$ of the magnetic thin film of the mother tape (see FIG. 2 and FIG. 3).

In the production of the magnetic recording media (a mother tape and/or a blank tape) each comprising two or more magnetic thin films comprising the columns of the magnetic grains grown obliquely, a magnetic metal is first obliquely deposited on the substrate 2 by evaporation to provide a magnetic thin film having a column gradient $\theta_n$ of the deposited magnetic grains. Then, the substrate bearing the magnetic thin film having a column gradient $\theta_n$ of the magnetic grains is placed on the feeding roller side in FIG. 1 and with the position of the guide roller 4 varied from the previous one (set to cause $\theta_n<\theta_{n-1}$), a magnetic metal is obliquely deposited by evaporation in the same manner as described above to provide a magnetic thin film having a column gradient $\theta_{n-1}$ ($\theta_n<\theta_{n-1}$) of the metal grains deposited. In the same manner, the subsequent magnetic metals are obliquely deposited by evaporation to provide finally the uppermost magnetic thin film having a column gradient $\theta_1$ of the magnetic grains deposited and whereby a magnetic recording medium comprising n layers of the magnetic thin films respectively having a column gradient of $\theta_n$, $\theta_{n-1}$, . . . . $\theta_1$ (n is an integer of 2 or more, $\theta_n<\theta_{n-1}<\ldots<\theta_1$), on the substrate 2 in this order from the lower side close to the substrate, is obtained.

Figure 6:
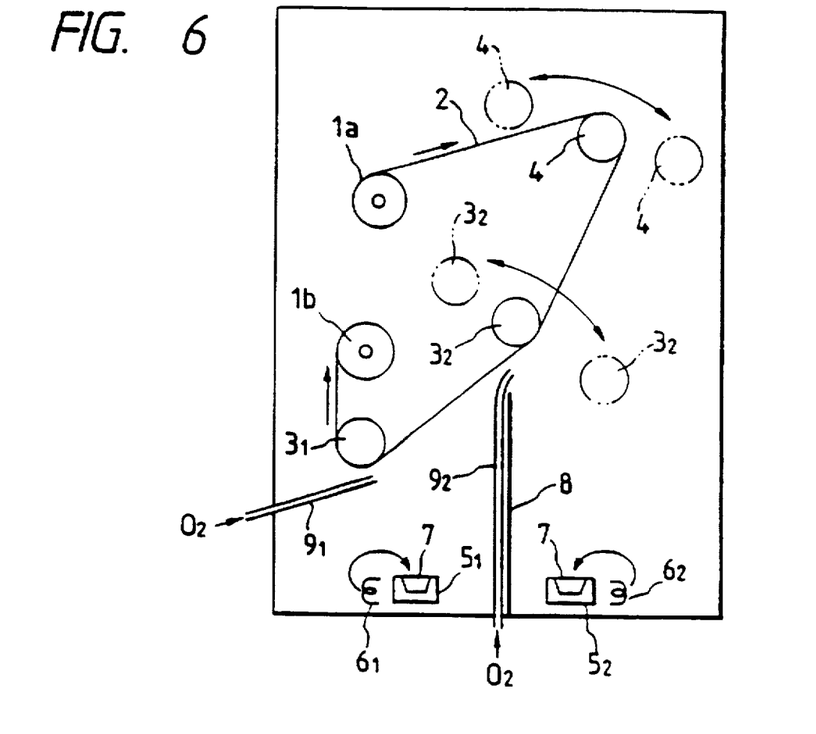
FIG. 6 is a schematic view showing the production of a blank tape comprising multi-layered magnetic thin films.

Alternatively, by employing an oblique evaporation apparatus as shown in FIG. 6, multi-layered magnetic thin films can be continuously provided. In FIG. 6, two magnetic thin films are provided on the substrate 2.

In FIG. 6, 1a is a feeding roller of the substrate 2, 1b is a take-up roller of the substrate 2, $3_1$ and $3_2$ are cooling can rollers, 4 is a guide roller provided on the running path of the substrate 2 between the feeding roller 1a and the cooling can roller $3_2$, $5_1$ and $5_2$ are crucibles, $6_1$ and $6_2$ are electron guns, 7 are magnetic metal, 8 is diaphragm, and $9_1$ and $9_2$ are oxygen gas feeding nozzle. In the production of a magnetic recording medium (a mother tape and/or a blank tape) using such an oblique evaporation apparatus, a magnetic metal is first obliquely deposited by evaporation on the substrate 2 placed at the cooling can roller $3_2$ to provide a magnetic thin film having a column gradient $\theta_2$ of magnetic grains deposited and then a magnetic metal is obliquely deposited by evaporation on the magnetic thin film on the substrate 2 placed at the cooling can roller $3_1$ to provide a magnetic thin film having a column gradient $\theta_1$ of magnetic grains deposited. The thus provided two-layered magnetic thin films satisfy the condition of $\theta_2<\theta_1$ because the angle of the running direction of the substrate 2 against the grains flying from the crucible $5_1$ is larger than the angle of the running direction of the substrate 2 against the grains flying from the crucible $5_2$.

On the variation of the embodiment shown in FIG. 6, if cooling can rollers and crucibles are prepared according to the number of layers to be deposited and the angle in the running direction of the substrate against the grains flying from respective crucibles is sequentially adjusted, a magnetic recording medium is produced to comprise the substrate 2 having provided thereon n layers of magnetic thin films respectively having a column gradient $\theta_n$, $\theta_{n-1}$, . . . . $\theta_1$ (n is an integer of 2 or more, $\theta_n<\theta_{n-1}<\theta_1$) in this order from the lower side.

Respective cooling can rollers and the guide roller 4 are constructed so as to able to change their positions and whereby the column gradient $\theta_k$ of the magnetic grains deposited by oblique evaporation can be controlled.

Figure 7:
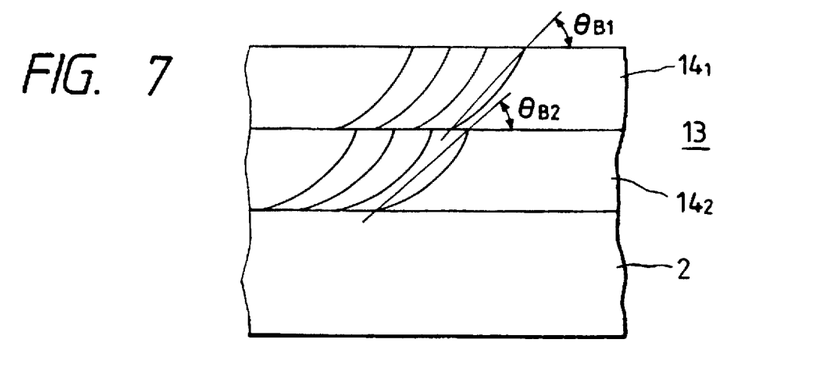
FIG. 7 is a schematic cross section of a blank tape comprising multi-layered magnetic thin films.
Figure 7A:
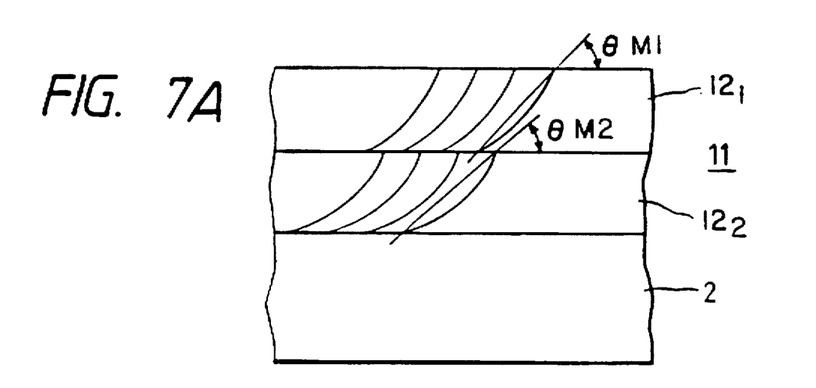
FIG. 7A is a schematic cross section of a mother tape comprising multi-layered magnetic thin films.

A schematic view of a blank tape comprising a substrate having thereon two magnetic thin films, prepared in the manner set forth above, is shown in FIG. 7. It may also be applied to a mother tape comprising a substrate having thereon two magnetic thin films, as shown in FIG. 7A. A schematic view of a magnetic recording medium for either a mother tape or a blank tape, which comprises a substrate having thereon three or more magnetic thin films, may also be shown in a similar manner.

The column size on the surface of the magnetic thin film can be controlled by varying the feeding amount of oxygen gas during depositing magnetic metal grains by oblique evaporation. More specifically, the column size become smaller as the feeding amount of oxygen gas increases, though it may vary depending on the manner of feeding of oxygen gas and the temperature of oxygen gas.

On the mother tape comprising the above-described magnetic thin film having a column gradient $\theta_{M1}$ or on the mother tape comprising a plurality of magnetic thin films satisfying the condition of $\theta_{Mn}<\theta_{M(n-1)}<\ldots<\theta_{M1}$, an information signal is being recorded by a common means. The information signal of the mother tape is duplicated by magnetic transfer onto the blank tape comprising the above-described magnetic thin film having a column gradient $\theta_{B1}$ or on the blank tape comprising multi-layered magnetic thin films satisfying the condition of $\theta_{Bn}<\theta_{B(n-1)}<\ldots<\theta_{B1}$.

Figure 4:
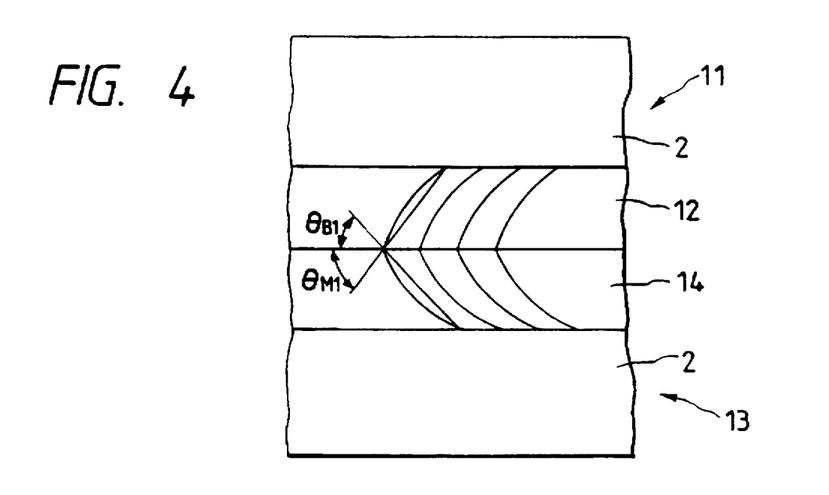
FIG. 4 is a schematic side view showing the positional relation between a mother tape and a blank tape on magnetic contact duplication.
Figure 5:
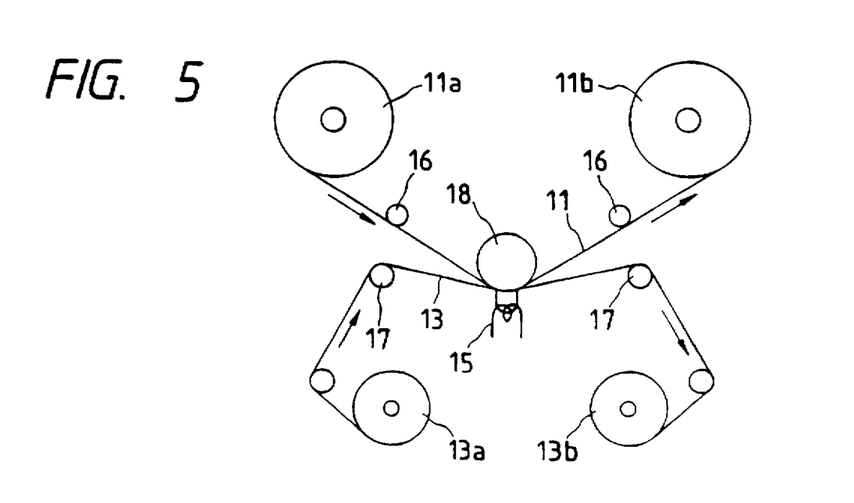
FIG. 5 is a schematic view showing an apparatus for magnetic contact duplication.

The duplication is conducted in such a manner, for example, as shown in FIG. 4 and FIG. 5.

Figure 8:
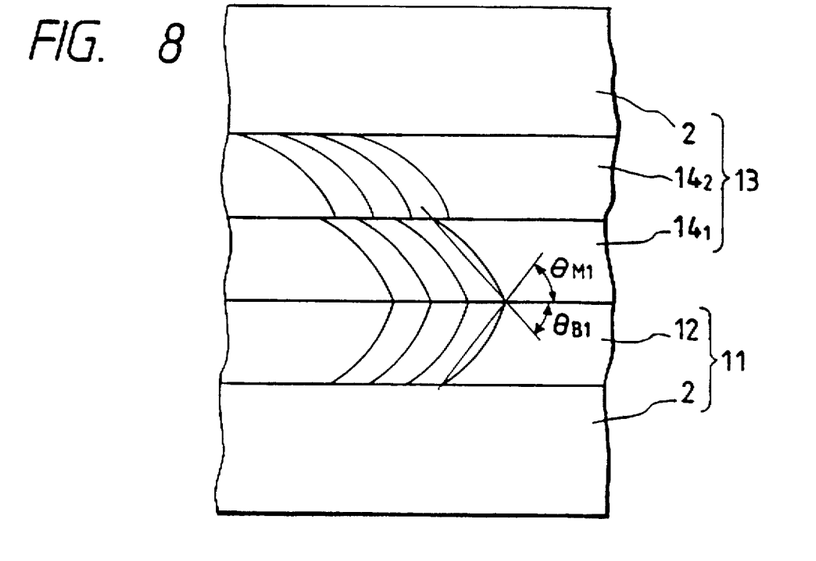
FIG. 8 is a schematic side view showing the positional relation between a mother tape and a blank tape on magnetic contact duplication in which the mother tape comprises one magnetic thin film and the blank tape comprises multi-layered magnetic thin films.

Specifically, on the transfer of the information signal, the mother tape 11 and the blank tape 13 are superposed such that the column growth direction $12_M$ in the magnetic thin film 12 and the column growth direction $14_B$ in the magnetic thin film 14 intersect and that the magnetic thin film 12 and the magnetic thin film 14 face each other as shown in FIG. 4. Alternatively, in the case where the duplication is conducted using a blank tape comprising multi-layered magnetic thin films satisfying the condition of $\theta_{Bn}<\theta_{B(n-1)}<\ldots<\theta_{B1}$, the mother tape 11 and the blank tape 13 are superposed such that the column growth direction $12_M$ in the magnetic thin film 12 and the column growth direction $14_B$ in the uppermost magnetic thin film $14_1$ intersect and that the magnetic thin film 12 and the uppermost magnetic thin film $14_1$ face each other as shown in FIG. 8. Likewise, in the case where the duplication is conducted using a mother tape comprising multi-layered magnetic thin films satisfying the condition of $\theta_{Mn}<\theta_{M(n-1)}<\ldots<\theta_{M1}$, the mother tape and the blank tape are superposed such that the column growth direction in the uppermost magnetic thin film of the mother tape and the column growth direction in the magnetic thin film or the uppermost magnetic thin film of the blank tape intersect and that the uppermost magnetic thin film of the mother tape and the magnetic thin film or the uppermost magnetic thin film of the blank tape face each other.

More practically, the mother tape 11 and the blank tape 13 are set to a magnetic contact duplication apparatus as shown in FIG. 5 so as to fulfill the relation shown in FIG. 4 at the position of a guide means 18. In this instance, the mother tape is positioned on the side of the guide means 18 (e.g., a transfer drum) comprising a soft magnetic material (e.g., Permalloy) and a bias magnetic field is applied by a magnetic head 15 (e.g., a ring-type magnetic head) from the substrate side of the blank tape 13 opposite to the guide means 18 to transfer the information signal recorded on the mother tape 11 to the blank tape 13. In FIG. 5, 11a is a feeding reel of the mother tape 11, 11b is a take-up reel of the mother tape 11, 13a is a feeding reel of the blank tape 13, 13b is a take-up reel of the blank tape 13, and 16 and 17 are guide rollers.

In the magnetic contact duplication of the information signal as described above, the duplication can be carried out at a high speed because it is effected by transferring. Moreover, the information signal is effectively duplicated because the bias magnetic field is applied in the direction of the axis of easy magnetization of the blank tape. Furthermore, the demagnetization of the mother tape is hardly caused because the bias magnetic field is applied in the direction of the axis of hard magnetization of the mother tape. Accordingly, the method of the present invention allows the repeated and accurate duplication of the information signal.

The present invention will be described below in greater detail with reference to the following specific examples but it should not be construed as being limited to these examples.

EXAMPLE 1

An embodiment of the present invention is explained below with reference to FIG. 1 to 5.

As shown in FIG. 1, the substrate (PET film) 2 was extended between the feeding roller 1a and the take-up roller 1b and run along the cooling can roller 3.

The guide roller 4 was set at the position E, and the vacuum container was evacuated to the degree of vacuum on the order of from $10^{-1}$ to $10^{-6}$ Torr. Thereafter, the magnetic metal (Co) 7 in the crucible 5 was melted and evaporated by the heat of electron beams shot from the electron gun 6, thereby depositing the Co grains on the PET film 2 sided by the cooling can roller 3 to give a thickness of 0.3 µm while feeding oxygen gas from the oxygen gas feeding nozzle 9. Thus, a one-layered magnetic thin film-type mother tape 11 was obtained.

The thus obtained mother tape 11 had a column structure as shown in FIG. 2, where the column gradient $\theta_{M1}$ was 60°, the Hc was 1,680 Oe, the Bs was 6,200 G, the Br/Bs was 0.81 and the center line average roughness Ra on the surface of the magnetic thin film 12 was 1.2 nm. The column size $a_M$ on the surface of the magnetic thin film of the mother tape 11 was 48 nm.

The tape was cut into the width of 8 mm and an information signal was recorded thereon in a reverse pattern to the track pattern of a normal high-band 8 mm VTR using a mirror mother manufacturing machine.

In the same manner (except for setting the guide roller 4 at the position G and using Co-Ni (80-20) alloy as a magnetic metal), a one-layered magnetic thin film-type blank tape 13 was prepared by depositing Co-Ni grains on the PET film 2 to have a thickness of 0.2 µm.

The thus obtained blank tape 13 had a column structure as shown in FIG. 3, where the column gradient $\theta_{B1}$ was 25°, the Hc was 1,040 Oe, the Bs was 4,100 G, the Br/Bs was 0.78 and the center line average roughness Ra on the surface of the magnetic thin film 14 was 2.4 nm. The column size $a_B$ on the surface of the magnetic thin film of the blank tape 13 was 31 nm.

The blank tape 11 was cut into the width of 8 mm.

Then, the mother tape 11 and the blank tape 13 were set in the magnetic contact duplication apparatus as shown in FIG. 5 so as to be superposed at the position of the guide means 18 such that the column growth direction $12_M$ in the magnetic thin film 12 of the mother tape 11 and the column growth direction $14_B$ in the magnetic thin film 14 of the blank tape 13 intersected and that the magnetic thin film 12 and the magnetic thin film $14_1$ faced each other, as shown in FIG. 8. Thus, the information signal recorded on the mother tape 11 was transferred to the blank tape 13 while applying a bias magnetic field by the ring-type magnetic head 15 from the substrate side of the blank tape 13.

EXAMPLE 2

A one-layered magnetic thin film-type mother tape 11 was prepared in accordance with the procedure of Example 1 except that a magnetic metal (Fe-Co (80:20) alloy) was deposited so as to give a column gradient $\theta_{M1}$=80°, Hc=1,490 Oe, Bs=7,300 G, Br/Bs=0.73 and Ra=1.1 nm.

On the resulting mother tape 11, the information signal was recorded in the same manner as in Example 1 and transferred to the same blank tape 13 as in Example 1.

EXAMPLE 3

A one-layered magnetic thin film-type blank tape 13 was prepared in accordance with the procedure of Example 1 except that the magnetic metal (Co-Ni (80:20) alloy) was deposited so as to give a column gradient $\theta_{B1}$=60°, Hc=920 Oe, Bs=4,800 G, Br/Bs=0.69 and Ra=1.3 nm.

To the resulting blank tape 13, the information signal recorded on the same mother tape 11 as in Example 2 was transferred.

EXAMPLE 4

A one-layered magnetic thin film-type mother tape 11 was prepared in accordance with the procedure of Example 1 except that the magnetic metal (Co) was deposited so as to give a column gradient $\theta_{M1}$=20°, Hc=1,830 Oe, Bs=7,100 G, Br/Bs=0.91 and Ra=1.8 nm and similarly a one-layered magnetic thin film-type blank tape 13 was prepared except that the magnetic metal (Co-Ni (80:20) alloy) was deposited so as to give a column gradient $\theta_{B1}$=5°, Hc=1,180 Oe, Bs=4,900 G, Br/Bs=0.87 and Ra=2.6 nm.

By using these tapes, the information signal recorded on the mother tape 11 was transferred to the blank tape 13 in the same manner as in Example 1.

EXAMPLE 5

A one-layered magnetic thin film-type mother tape 11 was prepared in accordance with the procedure of Example 1 except that the magnetic metal (Co) was deposited so as to give a column gradient $\theta_{M1}$=40°, Hc=1,710 Oe, Bs=7,700 G, Br/Bs=0.84 and Ra=1.6 nm and similarly a one-layered magnetic thin film-type blank tape 13 was prepared except that the magnetic metal (Co-Ni (80:20) alloy) was deposited so as to give a column gradient $\theta_{B1}$=20°, Hc=1,060 Oe, Bs=4,200 G, Br/Bs=0.78 and Ra=2.3 nm.

By using these tapes, the information signal recorded on the mother tape 11 was transferred to the blank tape 13 in the same manner as in Example 1.

COMPARATIVE EXAMPLE 1

The same mother tape 11 and the same blank tape 13 as in Example 1 were prepared and set in the magnetic contact duplication apparatus as shown in FIG. 5 so as to be superposed at the position of the guide means 18 such that the column growth direction $12_M$ in the magnetic thin film 12 of the mother tape and the column growth direction $14_B$ in the magnetic thin film 14 of the blank tape intersect and that the magnetic thin film 12 and the magnetic thin film 14 face with each other, as shown in FIG. 4, provided that the mother tape 11 was placed on the ring-type magnetic head 15 side. Thus, the information signal recorded on the mother tape 11 was transferred to the blank tape 11 while applying a bias magnetic field from the substrate side of the mother tape 11.

COMPARATIVE EXAMPLE 2

A one-layered magnetic thin film type-mother tape 11 was prepared in accordance with the procedure of Example 1 except that a magnetic metal (Co) was deposited so as to give a column gradient $\theta_{M1}=45°$, Hc=1,720 Oe, Bs=7,500 G, Br/Bs=0.83 and Ra=1.7 nm and similarly a one-layered magnetic thin film-type blank tape 13 was prepared except that the magnetic metal (Co-Ni) was deposited so as to give a column gradient $\theta_{B1}=60°$, Hc=810 Oe, Bs=4,400 G, Br/Bs=0.58 and Ra=2.1 nm.

By using these tapes, the information signal recorded on the mother tape 11 was transferred to the blank tape 13 in the same manner as in Example 1.

Characteristics

In respective examples and comparative examples above, the transfer from the mother tape 11 to the blank tape 13 was repeated 5,000 times and the reduction in output of the mother tape 11 and the reproduction output of the blank tape were measured using a commercially available high-band 8 mm VTR, which was modified, as a measuring apparatus. The results obtained are shown in Table 1 below.

TABLE 1

|  | Reduction in Output of Mother Table 11 (dB) | Reproduction Output of Blank Tape 13 | |
|---|---|---|---|
|  |  | 1 MHz (dB) | 7 MHz (dB) |
| Example 1 | 2.0 | −1.8 | −1.2 |
| Example 2 | 2.4 | −1.9 | −1.3 |
| Example 3 | 2.3 | −2.1 | −0.8 |
| Example 4 | 1.5 | −1.2 | −2.2 |
| Example 5 | 1.8 | −1.6 | −1.1 |
| Comparative Example 1 | 5.0 | −2.7 | −1.8 |
| Comparative Example 2 | 3.5 | −3.6 | −2.3 |

*The reproduction output of a record on a commercially available high-band evaporation tape by Head to Head was taken as 0 (dB).

As the results of Table 1 show, according to the method of the present invention, the information on the mother tape 11 has hardly undergone demagnetization and can be transferred to the blank tape 13 at a high reproduction output. In addition, the reproduction can be made fast, which ensures mass production of softwares at a low cost.

EXAMPLE 6

An embodiment of the present invention is explained below with reference FIGS. 1, 2 and 5 to 8.

As shown in FIG. 1, the substrate (PET film) 2 was extended between the feeding roller 1a and the take-up roller 1b and run along the cooling can roller 3.

The guide roller 4 was set at the position E, and the vacuum container was evacuated to the degree of vacuum on the order of from $10^{-4}$ to $10^{-6}$ Torr. Thereafter, a magnetic metal (Co) 7 in the crucible 5 was melted and evaporated by the heat of electron beams shot from the electron gun 6, thereby depositing the Co grains on the PET film 2 sided by the cooling can roller 3 to give a thickness of 0.28 μm, while feeding oxygen gas from the oxygen gas feeding nozzle 9. Thus a one-layered magnetic thin film-type mother tape 11 was obtained.

The thus-obtained mother tape 11 had a column structure as shown in FIG. 2, where the column gradient $\theta_{M1}$ was 60°, the Hc was 1,680 Oe, the Bs was 6,200 G, the Br/Bs was 0.81 and the center line average roughness Ra on the surface of the magnetic thin film 12 was 1.2 nm.

The mother tape was cut into the width of 8 mm and an information signal was recorded thereon in a reverse pattern to the track pattern of a normal high-band 8 mm VTR using a mirror mother manufacturing machine.

Separately, as shown in FIG. 6, a substrate (PET film) 2 was expanded between the feeding roller 1a and the take-up roller 1b, the guide roller 4 and the cooling can rollers $3_2$ and $3_1$ were set at the position shown by the solid line, and the PET film 2 was run along the guide roller 4 and the cooling can rollers 32 and 31.

A vacuum container was evacuated to the degree of vacuum on the order of from $10^{-4}$ to $10^{-6}$ Torr, and a magnetic metal (Co-Ni (80:20) alloy) 7 in the crucible $5_2$ was melted and evaporated by the heat of electron beams shot from the electron gun $6_2$, thereby depositing Co-Ni grains on the PET film 2 sided by the cooling can roller $3_2$ to give a thickness of 0.12 μm, while feeding oxygen gas from the oxygen gas feeding nozzle $9_2$. Thus, a lower magnetic thin film $14_2$ was formed. Subsequently, a magnetic metal (Co-Ni (80:20) alloy) 7 in the crucible $5_1$ was melted and evaporated by the heat of electron beams shot from the electron gun $6_1$, thereby depositing Co-Ni grains on the lower magnetic thin film $14_2$ on the PET film 2 sided by the cooling can roller $3_1$ to give a thickness of 0.08 μm, while feeding oxygen gas from the oxygen gas feeding nozzle $9_1$. Thus, an upper magnetic thin film $14_1$ was formed. In this way, a two-layered magnetic thin film-type blank tape 13 was obtained.

The thus obtained blank tape 13 had a column structure as shown in FIG. 7, where the column gradient $\theta_{B2}$ was 30°, the $\theta_{B1}$ was 45°, the Hc was 1,140 Oe, the Bs was 4,300 G, the Br/Bs was 0.79 and the center line average height Ra on the surface of the magnetic thin film $14_1$ was 2.1 nm.

The blank tape was cut into the width of 8 mm.

Then, the mother tape 11 and the blank tape 13 were set in the magnetic contact duplication apparatus as shown in FIG. 5 so as to be superposed at the position of the Permalloy-made transfer drum 18 such that the column growth direction $12_M$ in the magnetic thin film 12 of the mother tape 11 and the column growth direction $14_B$ in the magnetic thin film 14 of the blank tape 13 intersected and that the magnetic thin film 12 and the magnetic thin film $14_1$ faced each other, as shown in FIG. 8. Thus, the information signal recorded on the mother tape 11 was transferred to the blank tape 11 while applying a bias magnetic field by the ring-type magnetic head 15 from the substrate side of the blank tape 13.

EXAMPLE 7

A two-layered magnetic thin film-type blank tape 13 was prepared in accordance with the procedure of Example 6 except that the magnetic metal (Co-Ni (80:20) alloy) was deposited so as to give a column gradient $\theta_{B2}=15°$, $\theta_{B1}=30°$, Hc=1,180 Oe, Bs=4,700 G, Br/Bs=0.82 and Ra=1.9 nm. The column size $a_B$ on the surface area of the magnetic thin film of the blank tape 13 was 38 nm.

The information signal recorded on the same mother tape 11 as in Example 6 was transferred to the blank tape 13 of this Example.

EXAMPLE 8

A two-layered magnetic thin film-type blank tape 13 was prepared in accordance with the procedure of Example 6 except that the magnetic metal (Co-Ni (80:20) alloy) was deposited so as to give a column gradient $\theta_{B2}=10°$, $\theta_{B1}=50°$, Hc=1,000 Oe, Bs=4,600 G, Br/Bs=0.73 and Ra=2.3 nm.

The information signal recorded on the same mother tape 11 as in Example 6 was transferred to the blank tape 13 of this Example.

EXAMPLE 9

In accordance with the procedure of Example 6, a two-layered magnetic thin film-type mother tape 11 was prepared using a oblique evaporation apparatus as shown in FIG. 6 except that the magnetic metal (Co) was deposited so as to give column gradients $\theta_{M1}=45°$ and $\theta_{M1}=90°$, Hc=1,280 Oe, Bs=6,450 G, Br/Bs=0.76, Ra=1.8 nm and the total magnetic thin films thickness of 0.26 μm, and a one-layered magnetic thin film-type blank tape 13 was prepared except that the magnetic metal (Co-Ni (80:20) alloy) was deposited so as to give a column gradient $\theta_{B1}=10°$, Hc=1,180 Oe, Bs=4,900 G, Br/Bs=0.87 and Ra=2.6 nm. The column size $a_M$ on the surface area of the magnetic thin film of the mother tape 11 thus obtained was 39 nm.

By using these tapes, the information signal recorded on the mother tape 11 was transferred to the blank tape 13 in the same manner as in Example 6.

EXAMPLE 10

In accordance with the procedure of Example 6, a one-layered magnetic thin film-type mother tape 11 was prepared except that the magnetic metal (Co) was deposited so as to give a column gradient $\theta_{M1}=45°$, Hc=1,760 Oe, Bs=7,200 G, Br/Bs=0.84 and Ra=1.3 nm, and a two-layered magnetic thin film-type blank tape 13 was prepared except that the magnetic metal (Co-Ni (80:20) alloy) was deposited so as to give a column gradient $\theta_{B2}=10°$, $\theta_{B1}=40°$, Hc=1,030 Oe, Bs=4,300 G, Br/Bs=0.75 and Ra=1.8 nm.

By using these tapes, the information signal recorded on the mother tape 11 was transferred to the blank tape 13 in the same manner as in Example 6.

EXAMPLE 11

The transfer was conducted in the same manner as in Example 6 using the same mother tape 11 as in Example 9 and the same blank tape 13 as in Example 7.

COMPARATIVE EXAMPLE 3

The same mother tape 11 and the same blank tape 13 as in Example 6 were prepared and set in the magnetic contact duplication apparatus as shown in FIG. 5 so as to be superposed at the position of the guide means 18 such that the column growth direction $12_M$ in the magnetic thin film 12 of the mother tape 11 and the column growth direction $14_B$ in the magnetic thin film 14 of the blank tape 13 intersected and that the magnetic thin film 12 and the magnetic thin film $14_1$ faced each other, as shown in FIG. 8, provided that the mother tape was placed on the ring-type magnetic head 15 side. Thus, the information signal recorded on the mother tape 11 was transferred to the blank tape 13 while applying a bias magnetic field by the ring-type magnetic head 15 from the substrate side of the mother tape 11.

COMPARATIVE EXAMPLE 4

A two-layered magnetic thin film-type blank tape 13 was prepared in accordance with the procedure of Example 6 except that the magnetic metal (Co-Ni (80:20)) was deposited so as to give a column gradient $\theta_{B2}=45°$, $\theta_{B1}=30°$, Hc=1,080 Oe, Bs=4,300 G, Br/Bs=0.77 and Ra=2.1 nm.

By using these tapes, the information signal recorded on the mother tape 11 was transferred to the blank tape in the same manner as in Example 6.

COMPARATIVE EXAMPLE 5

A one-layered magnetic thin film-type mother tape 11 was prepared in accordance with the procedure of Example 6 except that the magnetic metal (Co) was deposited so as to give a column gradient $\theta_{M1}=30°$, Hc=1,710 Oe, Bs=7,300 G, Br/Bs=0.85 and Ra=1.2 nm.

The information signal recorded on this mother tape was transferred to the same blank tape 13 as used in Example 6 in the same manner as in Example 6.

COMPARATIVE EXAMPLE 6

A two-layered magnetic thin film-type mother tape 11 was prepared in accordance with the procedure of Example 9 except that the magnetic metal (Co) was deposited so as to give column gradients $\theta_{M2}=30°$ and $\theta_{M1}=15°$, Hc=1,690 Oe, Bs=6,900 G, Ra=1.3 nm and the total magnetic thin films thickness of 0.25 μm.

The information signal recorded on this mother tape was transferred to the same blank tape as used in Example 8 in the same manner as in Example 6.

Characteristics

In Examples 6–11 and Comparative Examples 3–6 above, the transfer from the mother tape to the blank tape was repeated 5,000 times and the reduction in output of the mother tape and the reproduction output of the blank tape 13 were measured. The results obtained are shown in Table 2 below.

TABLE 2

| | Reduction in Output of Mother Table 11 (dB) | Reproduction Output of Blank Tape 13 | |
|---|---|---|---|
| | | 1 MHz (dB) | 7 MHz (dB) |
| Example 6 | 1.8 | −1.6 | −1.1 |
| Example 7 | 1.8 | −1.0 | −2.1 |
| Example 8 | 1.9 | −1.9 | −0.9 |
| Example 9 | 2.1 | −2.3 | −0.8 |
| Example 10 | 2.5 | −1.5 | −1.3 |
| Example 11 | 1.6 | −1.4 | −0.7 |
| Comparative Example 3 | 3.6 | −1.8 | −1.2 |
| Comparative Example 4 | 2.1 | −3.4 | −2.0 |
| Comparative Example 5 | 3.2 | −2.1 | −1.5 |

TABLE 2-continued

|  | Reduction in Output of Mother Table 11 (dB) | Reproduction Output of Blank Tape 13 | |
|---|---|---|---|
|  |  | 1 MHz (dB) | 7 MHz (dB) |
| Comparative Example 6 | 3.3 | −2.2 | −1.8 |

*The reproduction output of a record on a commercially available high-band evaporation tape by Head to Head was taken as 0 (dB).

As the results of Table 2 show, according to the present invention, the information on the mother tape 11 is hardly undergone demagnetization and can be transferred to the blank tape 13 at a high reproduction output. In addition, the reproduction can be made fast, which ensures mass production of softwares at a low cost.

EXAMPLE 12

In accordance with the procedure of Example 1 except that the feeding amount of oxygen gas on the production of the blank tape was increased to 1.6 times by volume of the feeding amount of oxygen gas on the production of the mother tape, a mother tape 11 having a column size $a_M$ of the surface of the magnetic thin film of 48 nm and a blank tape 13 having a column size $a_B$ of the surface of the magnetic thin film of 22 nm were obtained.

By using these tapes, the information signal recorded on the mother tape 11 was transferred to the blank tape in the same manner as in Example 1.

EXAMPLE 13

A two-layered magnetic thin film-type mother tape 11 having a column size $a_M$ of the surface of the magnetic thin film of 39 nm was prepared in accordance with the procedure of Example 9. Separately, a two-layered magnetic thin film-type blank tape 13 having a column size $a_B$ of the surface of the magnetic thin film of 19 nm was prepared in accordance with the procedure of Example 7 except that the feeding amount of oxygen gas was fed on the production of the blank tape was increased to 1.5 times by volume of the feeding amount of oxygen gas on the production of the above-mentioned mother tape.

By using these tapes, the information signal recorded on the mother tape 11 was transferred to the blank tape in the same manner as in Example 11.

Characteristics

In Examples 12 and 13 above, the transfer from the mother tape to the blank tape was repeated 5,000 times and the reduction in output of the mother tape and the reproduction output of the blank tape were measured. The results obtained are shown in Table 3 below. The results of the same characteristics test conducted in Examples 1 and 11 are also shown in Table 3 below.

TABLE 3

|  | Reduction in Output of Mother Table 11 (dB) | Reproduction Output of Blank Tape 13 | |
|---|---|---|---|
|  |  | 1 MHz (dB) | 7 MHz (dB) |
| Example 12 | 1.4 | −1.0 | −0.5 |
| Example 13 | 1.2 | −0.9 | −0.4 |

TABLE 3-continued

|  | Reduction in Output of Mother Table 11 (dB) | Reproduction Output of Blank Tape 13 | |
|---|---|---|---|
|  |  | 1 MHz (dB) | 7 MHz (dB) |
| Example 1 | 2.0 | −1.8 | −1.2 |
| Example 11 | 1.6 | −1.4 | −0.7 |

*The reproduction output of a record on a commercially available high-band evaporation tape by Head to Head was taken as 0 (dB).

While the invention has been described in detail and with reference to specific embodiments thereof, it will be apparent to one skilled in the art that various changes and modifications can be made therein without departing from the spirit and scope thereof.

What is claimed is:

1. In a system for magnetic contact duplication by transferring an information signal recorded on a mother tape onto a blank tape, the improvement comprising:

said mother tape and said blank tape each comprising a substrate on which is formed at least one magnetic thin film having columns of magnetic grains grown obliquely, an uppermost magnetic thin film being defined as a magnetic thin film of said at least one magnetic thin film which is farthest from the substrate, and a lowermost magnetic thin film being defined as a magnetic thin film of said at least one magnetic thin film which is closest to the substrate;

the uppermost magnetic thin film of the blank tape having a column gradient $\theta_{B1}$ of the magnetic grains which is smaller than a column gradient $\theta_{M1}$ of the magnetic grains in the uppermost magnetic thin film of the mother tape, $\theta_{B1}$ and $\theta_{M1}$ being defined as angles formed by an intersection of a chord which intersects a column grain at the top and bottom surfaces of said uppermost magnetic thin film and a top surface of said uppermost magnetic thin film of said blank tape and said mother tape;

said mother tape and blank tape superposed such that the column gradient $\theta_{M1}$ of the magnetic grains in the uppermost magnetic thin film of the mother tape and a column gradient $\theta_{B1}$ of the magnetic grains in the uppermost magnetic thin film of the blank tape intersect and said uppermost magnetic thin films of said mother tape and said blank tape face each other; and means for applying a bias magnetic field from a substrate side of said blank tape;

wherein when said at least one magnetic thin film of said mother tape or said blank tape comprises a single magnetic thin film the uppermost and lowermost magnetic thin films are one and the same.

2. The system of claim 1, wherein said means for applying said bias magnetic field comprises a ring-type magnetic head.

3. The system of claim 1, further comprising, a magnetic contact duplication apparatus including a transfer drum;

said mother tape and blank tape superposed in said magnetic contact duplication apparatus at a position of said transfer drum; and said means for applying said bias magnetic field arranged opposite said transfer drum and facing said substrate side of said blank tape.

4. The system of claim 1, wherein $\theta_{M1}$ is from 20° to 90° and $\theta_{B1}$ is from 5° to 60°.

5. The system of claim 1, wherein $\theta_{M1}-\theta_{B1}$ is from 15° to 75°.

6. The system of claim 1, wherein said blank tape comprises a plurality of magnetic thin films in which column gradients increase from the lowermost magnetic thin film toward the uppermost magnetic thin film.

7. The system of claim 6, wherein in said blank tape a column gradient $\theta_{Bn}$ of the magnetic grains in the lowermost magnetic thin film is from 5° to 45° and the column gradient $\theta_{B1}$ of the magnetic grains in the uppermost magnetic thin film is from 25° to 60°.

8. The system of claim 1, wherein said blank tape comprises no more than three magnetic thin films in which column gradients increase from the lowermost magnetic thin film toward the uppermost magnetic thin film.

9. The system of claim 1, wherein a thickness of said at least one magnetic thin film of said blank tape is from 0.10 to 0.30 µm.

10. The system of claim 1, wherein said mother tape comprises a plurality of magnetic thin films in which column gradients increase from the lowermost magnetic thin film toward the uppermost magnetic thin film.

11. The system of claim 10, wherein in said mother tape a column gradient $\theta_{Mn}$ in the lowermost magnetic thin film is from 20° to 45° and the column gradient $\theta_{M1}$ of the magnetic grains in the uppermost magnetic thin film is from 40° to 90°.

12. The system of claim 1, wherein a thickness of said at least one magnetic thin film of said mother tape is from 0.12 to 0.50 µm.

13. The system of claim 1, wherein said at least one magnetic thin film of at least one of said mother tape and said blank tape is a soft magnetic thin film provided on the substrate.

14. The system of claim 1, wherein a column size of the magnetic grains on a surface of the uppermost magnetic thin film of said blank tape is one half or less of a column size of the magnetic grains on a surface of the uppermost magnetic thin film of said mother tape.

15. In a system for magnetic contact duplication by transferring an information signal recorded on a mother tape onto a blank tape, the improvement comprising:

said mother tape and said blank tape each comprising a substrate on which is formed at least one magnetic thin film having columns of magnetic grains grown obliquely, an uppermost magnetic thin film being defined as a magnetic thin film of said at least one magnetic thin film which is farthest from the substrate, and a lowermost magnetic thin film being defined as a magnetic thin film of said at least one magnetic thin film which is closest to the substrate;

the uppermost magnetic thin film of the blank tape having a column gradient $\theta_{B1}$ of the magnetic grains which is smaller than a column gradient $\theta_{M1}$ of the magnetic grains in the uppermost magnetic thin film of the mother tape, $\theta_{B1}$ and $\theta_{M1}$ being defined as angles formed by an intersection of a chord which intersects a column grain at the top and bottom surfaces of said uppermost magnetic thin film and a top surface of said uppermost magnetic thin film of said blank tape and said mother tape;

said mother tape and blank tape superposed such that the column gradient $\theta_{M1}$ of the magnetic grains in the uppermost magnetic thin film of the mother tape and a column gradient $\theta_{B1}$ of the magnetic grains in the uppermost magnetic thin film of the blank tape intersect and said uppermost magnetic thin films of said mother tape and said blank tape face each other; and means for applying a bias magnetic field from a substrate side of said blank tape.

16. The system of claim 15, wherein said means for applying said bias magnetic field comprises a ring-type magnetic head.

17. The system of claim 15, further comprising, a magnetic contact duplication apparatus including a transfer drum;

said mother tape and blank tape superposed in said magnetic contact duplication apparatus at a position of said transfer drum; and said means for applying said bias magnetic field arranged opposite said transfer drum and facing said substrate side of said blank tape.

18. The system of claim 15, wherein $\theta_{M1}$ is from 20° to 90° and $\theta_{B1}$ is from 5° to 60°.

19. The system of claim 15, wherein $\theta_{M1}-\theta_{B1}$ is from 15° to 75°.

20. The system of claim 15, wherein a column size of the magnetic grains on a surface of the uppermost magnetic thin film of said blank tape is one half or less of a column size of the magnetic grains on a surface of the uppermost magnetic thin film of said mother tape.

* * * * *